United States Patent
Li et al.

(10) Patent No.: US 10,070,273 B2
(45) Date of Patent: Sep. 4, 2018

(54) MULTICAST GROUP MANAGEMENT TECHNIQUE

(71) Applicant: Apple Inc., Cupertino, CA (US)

(72) Inventors: Guoqing Li, Campbell, CA (US); Su Khiong Yong, Palo Alto, CA (US); Yong Liu, Campbell, CA (US); Christiaan A. Hartman, San Jose, CA (US); Gregory Chapman, San Jose, CA (US); Eric San Fung Lee, Mountain View, CA (US); Chiu Ngok E. Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/988,110

(22) Filed: Jan. 5, 2016

(65) Prior Publication Data
US 2016/0198317 A1    Jul. 7, 2016

Related U.S. Application Data

(60) Provisional application No. 62/112,545, filed on Feb. 5, 2015, provisional application No. 62/099,968, filed on Jan. 5, 2015.

(51) Int. Cl.
  *H04H 20/71*    (2008.01)
  *H04W 4/08*    (2009.01)
(52) U.S. Cl.
  CPC ..................... *H04W 4/08* (2013.01)
(58) Field of Classification Search
  CPC ........................................................ H04W 4/08
  USPC ......... 370/312–336, 352–395; 709/204–219, 709/231–245
  See application file for complete search history.

(56) References Cited

U.S. PATENT DOCUMENTS

| | | | | |
|---|---|---|---|---|
| 7,400,596 | B1 * | 7/2008 | Robertson | H04L 12/189 370/312 |
| 7,848,342 | B2 * | 12/2010 | Kamata | H04M 15/00 370/312 |
| 7,945,936 | B2 * | 5/2011 | Yamagishi | H04L 12/1886 725/119 |
| 8,687,536 | B2 * | 4/2014 | Michaelis | H04L 12/185 370/312 |
| 9,438,661 | B2 * | 9/2016 | Glasser | H04L 67/1008 |

(Continued)

*Primary Examiner* — Man Phan
(74) *Attorney, Agent, or Firm* — Sterne, Kessler, Goldstein & Fox, PLLC

(57) ABSTRACT

In order to flexibly manage and broadcast content to electronic devices in a multicast group, a multicast group management protocol allows one or more multicast group masters to be specified. In addition to controlling membership in the multicast group, a multicast group master can define or specify a multicast session, in which content from one or more sources is broadcast to at least a subset of the electronic devices or sinks in the multicast group. The multicast group management protocol supports concurrent broadcasts of content to different multicast sessions. Moreover, the broadcasts in the different multicast sessions may have different: priorities, encoding techniques, quality-of-service policies, reliability, and/or number of parity bits. For example, the different encoding techniques may include different layers in H.264 Scalable Video Coding. Alternatively or additionally, the different number of parity bits may be associated with application layer forward error correction.

23 Claims, 13 Drawing Sheets

(56) References Cited

U.S. PATENT DOCUMENTS

| | | | |
|---|---|---|---|
| 9,456,315 B2* | 9/2016 | Lohmar | |
| 2005/0063409 A1* | 3/2005 | Oommen | H04L 12/1836 370/432 |
| 2006/0218227 A1* | 9/2006 | Spear | G06Q 30/06 709/203 |
| 2007/0133565 A1* | 6/2007 | Hyun | H04L 45/00 370/395.52 |
| 2011/0283014 A1* | 11/2011 | Malik | H04L 47/10 709/233 |
| 2013/0121230 A1* | 5/2013 | Kim | H04W 56/0045 370/312 |
| 2016/0344566 A1* | 11/2016 | Pudney | H04L 12/185 |

* cited by examiner

MULTICAST GROUP MANAGEMENT TECHNIQUE

CROSS-REFERENCE TO RELATED APPLICATIONS

This application claims benefit of U.S. Provisional Patent Application No. 62/099,968 filed Jan. 5, 2015, and U.S. Provisional Patent Application No. 62/112,545 filed Feb. 5, 2015, the contents of which are incorporated herein by reference in their entireties.

BACKGROUND

Field

The described embodiments generally relate to wireless communication among electronic devices in a multicast group, including to techniques for managing a multicast group and for broadcasting content to different subsets of the multicast group.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

One wireless communication technique for providing content to multiple electronic devices leverages a multicast group. For example, the content may be broadcast to the electronic devices in the multicast group (which are sometimes referred to as 'sinks') using a unicast broadcast from a source. This communication technique allows resources (such as content generation and communication) to be shared, which can reduce the overall power consumption.

However, during a unicast broadcast, acknowledgments are not received from the electronic devices in the multicast group. Consequently, the quality of service may vary considerably among the electronic devices in the multicast group. In addition, this communication technique is inflexible and, therefore, is unable to, for example: address the different requirements of the electronic devices in the multicast group (such as different latencies); and/or respond to changes in the content.

SUMMARY

The described embodiments relate to an electronic device that includes: an antenna, and an interface circuit that communicates with electronic devices in a multicast group via wireless communication using the antenna. This electronic device includes a processor and memory, which stores a program module that, during operation, is executed by the processor. The program module includes instructions for: generating content; and broadcasting, via the interface circuit, the content to a multicast session that includes a subset of the multicast group.

In some embodiments, the program module includes instructions for setting up the multicast session. Note that setting up the multicast session may exclude authentication of the electronic devices in the multicast group (and, more generally, without a secure setup process).

Moreover, the program module may include instructions for broadcasting, via the interface circuit, the content to a second multicast session that includes a second subset of the devices in the multicast group, where the receiving devices in the second multicast session is different than that in the first multicast session.

Furthermore, the content may be broadcast to the second multicast session concurrently with the broadcast to the multicast session and/or the content may be broadcast differently to the second multicast session than to the multicast session.

Additionally, the program module may include instructions for functioning as a multicast-group master for the multicast group, where the multicast-group master manages membership in multicast sessions and/or the multicast group. In some embodiments, the program module includes instructions for transitioning the function as the multicast-group master to another electronic device in the multicast group. Note that the transition may be in response to a request from the other electronic device.

Moreover, the content may include audio/video information.

Another embodiment provides the electronic device that performs some or all of the preceding operations in hardware (e.g., without using the program module executed by the processor). More generally, the electronic device may be hardware configured to perform some or all of the preceding operations.

Another embodiment provides a computer-program product for use with the electronic device. This computer-program product includes instructions for at least some of the operations performed by the electronic device.

Another embodiment provides a method for broadcasting the content, which may be performed by the electronic device. During operation, the processor in the electronic device generates the content. Then, the interface circuit in the electronic device broadcasts the content to the multicast session that includes the subset of the multicast group.

The described embodiments relate to an electronic device that includes: an antenna, and an interface circuit that communicates with electronic devices in a multicast group via wireless communication using the antenna. This electronic device includes a processor and memory, which stores a program module that, during operation, is executed by the processor. The program module includes instructions for: generating content; and broadcasting, via the interface circuit, the content to different multicast sessions in the multicast group, where a given multicast session includes at least a subset of the multicast group, and the content is broadcast differently to the different multicast sessions.

Note that broadcasting the content to the different multicast sessions may involve a multicast broadcast and/or a unicast broadcast.

Moreover, the packets that are broadcasted to the different multicast sessions may have different priorities based on a criticality metric of packets associated with the content. Furthermore, the broadcasts to the different multicast sessions may use different encoding techniques. For example, the different encoding techniques may include different layers in H.264 Scalable Video Coding. Additionally, the broadcasts to the different multicast sessions may have different quality-of-service policies and/or different reliability. In some embodiments, the broadcasts to the different multicast sessions include a different number of parity bits. In particular, the parity bits may be associated with application layer forward error correction techniques.

Another embodiment provides the electronic device that performs some or all of the preceding operations in hardware (e.g., without using the program module executed by the processor). More generally, the electronic device may be hardware configured to perform some or all of the preceding operations of the electronic device.

Another embodiment provides a computer-program product for use with the electronic device. This computer-program product includes instructions for at least some of the operations performed by the electronic device.

Another embodiment provides a method for broadcasting the content, which may be performed by the electronic device. During operation, the processor in the electronic device generates the content. Then, the interface circuit in the electronic device broadcasts the content to the different multicast sessions in the multicast group, where a given multicast session includes at least a subset of the multicast group, and the content is broadcast differently to the different multicast sessions.

The described embodiments relate to an electronic device that includes: an antenna, and an interface circuit that communicates with a second electronic device via wireless communication using the antenna. This electronic device determines multiple samples of an MPEG media clock and a radio clock associated with the interface circuit. Then, the electronic device transmits, via the interface circuit, the samples of the MPEG media clock and the radio clock to the second electronic device.

Note that, for a given sample, the MPEG media clock and the radio clock may be concurrently sampled.

Moreover, the electronic device may generate IEEE 802.11 timing measurement frames that include the samples of the MPEG media clock and the radio clock, and the transmitting may involve transmitting the IEEE 802.11 timing measurement frames to the second electronic device. In some embodiments, the samples of the MPEG media clock and the second radio clock have a media clock timestamp format that is compatible with an MPEG program clock reference field. For example, the media clock timestamp format may include 42 bits.

Furthermore, the radio clock may be associated with an IEEE 802.11 communication protocol.

Additionally, the samples of the MPEG media clock and the radio clock may be other than periodic.

In some embodiments, the electronic device includes: a processor; and memory, which stores a program module that, during operation, is executed by the processor. The program module includes instructions for at least some of the operations performed by the electronic device.

Another embodiment provides a computer-program product for use with the electronic device. This computer-program product includes instructions for at least some of the operations performed by the electronic device.

Another embodiment provides a method for transmitting the samples, which may be performed by the electronic device. During operation, the processor in the electronic device determines the samples of the MPEG media clock and the radio clock associated with the interface circuit. Then, the interface circuit in the electronic device transmits the samples of the MPEG media clock and the radio clock to the second electronic device.

Another embodiment provides the second electronic device, which includes: a second antenna; and a second interface circuit that communicates with the electronic device via wireless communication using the second antenna. The second electronic device receives, from the electronic device, the multiple samples of the MPEG media clock and the radio clock associated with the interface circuit in the electronic device. Then, the second electronic device calculates a media clock based on a frequency of a second radio clock associated with the second interface circuit, and the multiple samples of the MPEG media clock and the radio clock.

Note that the samples of the MPEG media clock and the radio clock may be included in IEEE 802.11 timing measurement frames. In some embodiments, the samples of the MPEG media clock and the radio clock have the media clock timestamp format that is compatible with the MPEG program clock reference field. For example, the media clock timestamp format may include 42 bits.

Moreover, the radio clock may be associated with the IEEE 802.11 communication protocol.

Furthermore, the samples of the MPEG media clock and the radio clock may be other than periodic.

Additionally, the second electronic device may use the calculated media clock instead of one or more MPEG program-clock-reference timestamps.

In some embodiments, the second electronic device includes: a second processor; and second memory, which stores a second program module that, during operation, is executed by the second processor. The second program module includes instructions for at least some of the operations performed by the second electronic device.

Another embodiment provides a computer-program product for use with the second electronic device. This computer-program product includes instructions for at least some of the operations performed by the second electronic device.

Another embodiment provides a method for calculating the media clock, which may be performed by the second electronic device. During operation, the second interface circuit in the second electronic device receives the multiple samples of the MPEG media clock and the radio clock associated with the interface circuit in the electronic device. Then, the second processor in the second electronic device calculates the media clock based on a frequency of the second radio clock associated with the second interface circuit, and the multiple samples of the MPEG media clock and the radio clock.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
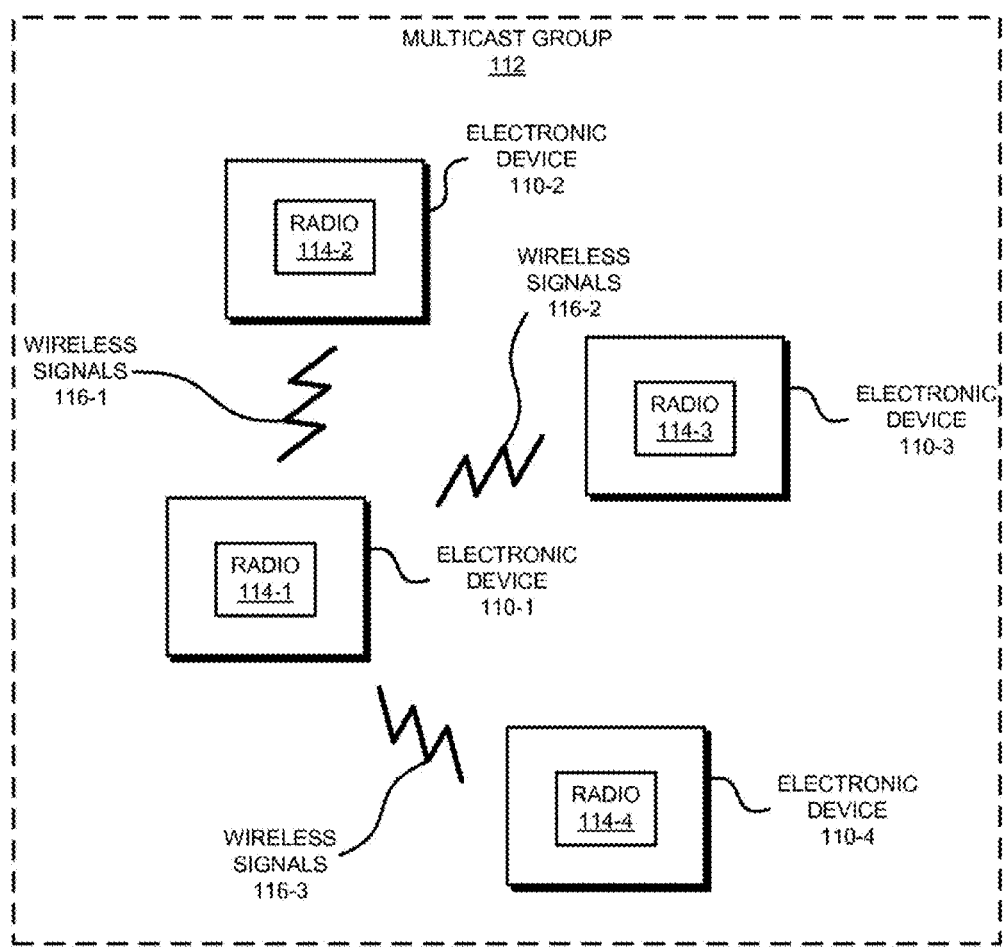
FIG. 1 is a block diagram illustrating example electronic devices communicating in a multicast group in accordance with an embodiment of the present disclosure.

Provided herein are system, method and/or computer program product embodiments, and/or combinations and sub-combinations thereof, for multicast group management and/or aspects of multicast group communication. Some embodiments operate by broadcasting generated content to a multicast session that includes a subset of electronic devices in a multicast group. By broadcasting the generated content to a multicast session, the generated content can be efficiently sent to a subset of electronic devices in the multicast group.

Other embodiments operate by broadcasting generated content to a specific multicast session based on a content transmission policy of the multicast session. This may improve the quality of the broadcast content, and allow the communication of the content to be adapted based on varying requirements in the multicast group. Consequently, this may improve the user experience when viewing the content on the electronic devices.

Other embodiments operate by determining multiple samples of a media clock and a radio clock at an electronic device in a multicast group. Some embodiments then transmit the samples to another electronic device. By transmitting the samples to the other electronic device, the two electronic devices can be synchronized for rendering purposes.

In embodiments, a multicast group management protocol enables the flexible management and broadcasting of content to electronic devices in a multicast group. A multicast group may include one or more electronic devices. As would be appreciated by a person of ordinary skill in the art, an electronic device may include an antenna and an interface circuit that communicates with a second electronic device via wireless communication using the antenna. An electronic device in a multicast group may be a source, a sink, and/or a multicast group master.

In embodiments, a source generates wireless display content for consumption by one or more sinks. In embodiments, a sink consumes wireless display content generated by a source.

In embodiments, a multicast group master is a logical entity. In an embodiment, a multicast group master may be located in the same physical electronic device as a source or sink. In some embodiments, a multicast group master may be located among multiple physical electronic devices. A multicast group master may create a multicast group, admit electronic devices into a multicast group, create and manage one or more multicast sessions in a multicast group, and manage source switching in a multicast group. In some embodiments, a multicast group master may perform source switching without the need for electronic devices to go through a new secure setup process.

In embodiments, one or more multicast group masters are specified for a multicast group. In addition to controlling membership in the multicast group, a multicast group master can define or specify a multicast session in which content from one or more sources is broadcast to at least a subset of the sinks in the multicast group.

In embodiments, a multicast group can have multiple multicast sessions. The multiple multicast sessions may have the same or different sources. In embodiments, the multicast group management protocol supports concurrent broadcasts of content to different multicast sessions. In embodiments, the broadcasts to the different multicast sessions may have different priorities, encoding techniques, quality-of-service (QoS) policies, reliability characteristics, and/or number of parity bits. For example, different encoding techniques may be used for packets corresponding to different layers in H.264 Scalable Video Coding. Alternatively or additionally, a different number of parity bits may be associated with application layer forward error correction (FEC).

In embodiments, a multicast session can be established between a source and one or more sinks without the formation of a multicast group. In the absence of a multicast group, and thus the absence of a multicast group master, the multicast session can be managed by one or more devices, e.g., a source, a sink, or a combination thereof. The device or devices managing a multicast session can perform all management functions, including sending and responding to messages, such as join request, invite, and leave messages. Accordingly, the descriptions of session management presented in the context of a multicast group can also be performed without formation of a multicast group.

In these ways, the communication technique that implements the multicast-group management protocol may improve the quality of the broadcast content, and allow the communication of the content to be adapted (as needed) based on varying requirements or conditions in the multicast group. Consequently, the communication technique may improve the user experience when viewing the content (such as audio/video or A/V information) on the electronic devices.

In embodiments, the content being broadcast (e.g. A/V information, and more generally data) may be conveyed in packets that are received by radios in the electronic devices in the multicast group in accordance with a communication protocol, e.g. an Institute of Electrical and Electronics Engineers (IEEE) 802.11 standard (which is sometimes referred to as Wi-Fi), Bluetooth (from the Bluetooth Special Interest Group of Kirkland, Wash.), Bluetooth Low Energy (BTLE), and/or another type of wireless communication protocol. In the discussion that follows, Wi-Fi is used as an illustrative example. However, a wide variety of communication protocols may be used as would be appreciated by a person of ordinary skill in the art.

FIG. 1 is a block diagram of electronic devices 110 wirelessly communicating in a multicast group 112, according to an example embodiment. In an embodiment, multicast group 112 is a collection of one or more electronic devices 110. In an embodiment, the one or more electronic devices 110 transmit and receive content wirelessly using radios. In an embodiment, multicast group 112 may facilitate one-to-many distribution in which content or information from one source is simultaneously addressed to multiple sinks. In another embodiment, multicast group 112 may facilitate many-to-many distribution in which content or information from multiple sources is simultaneously addressed to multiple sinks.

In an embodiment, there may be at least three different device roles in multicast group 112. An electronic device may be, for example, source of content, a sink of content, and/or a multicast group master. In an embodiment, a multicast group master may implement the multicast group management protocol that governs: how to setup, join, maintain, leave, and terminate a multicast group (e.g. multicast group 112), and/or one or more multicast sessions (in which particular content from one or more sources is broadcast to at least a subset of electronic devices, e.g. electronic devices 110 in multicast group 112).

As noted above, a multicast session may be instantiated without the formation of a multicast group. For example, electronic device 110-1 may perform multicast service discovery and connection management in which wireless communication is used to: detect electronic devices that are currently not members of multicast group 112 by scanning wireless channels, transmitting or receiving beacons or beacon frames on wireless channels, establishing connections (for example, by transmitting connect requests or invitations to join multicast group 112), and/or transmitting and receiving packets (which may include the requests and/or additional information, such as the multicast address, as payloads when an electronic device joins multicast group 112). Thus, electronic device 110-1 may facilitate non-members discovering an existing multicast group (such as multicast group 112) and multicast sessions, and then may set up radio-layer connections among the electronic devices that join multicast group 112.

Moreover, as described further below with reference to FIGS. 3-6, electronic device 110-1 may manage the dynamic switching between multiple sources of content (which may or may not include electronic device 110-1) that are broadcast to the same or different subsets of electronic devices 110 in multicast group 112 in different multicast sessions.

Furthermore, as described further below with reference to FIGS. 5 and 6, in an embodiment, an electronic device (e.g. electronic device 110-1) may implement QoS/reliability policies and/or power-saving techniques by varying how content is broadcast to different multicast sessions in a multicast group 112 (e.g. multicast group 112).

For example, the broadcasts in the different multicast sessions may have different: priorities, encoding techniques, QoS policies, reliability, number of parity bits and/or other characteristics and attributes. For example, the different encoding techniques may include different layers in H.264 Scalable Video Coding, such that one multicast session may convey the base layer (with the most-basic information that is important for decoding), while another multicast session may include a higher-layer with additional content information that can provide better video quality if correctly decoded. Alternatively or additionally, the different number of parity bits may be associated with application layer FEC, such that one multicast session deliver the original content, while another multicast session includes parity bits generated by application FEC that, in conjunction with a more robust QoS policy (such as a low modulation coding scheme or MCS) enhance the reliability of the communicated content.

While multicast group 112 is illustrated as having one multicast group master (e.g. electronic device 110-1), as would be appreciated by a person of ordinary skill in the art there may be more than one multicast group master in a multicast group. In an embodiment, multiple multicast group masters may share some or all of the functionality in the multicast-group management protocol. For example, a given multicast group master may be responsible for membership and broadcasts of content to a subset of electronic devices 110 in multicast group 112. Alternatively, one multicast group master may control membership in multicast group 112, while another multicast group master may setup and control different multicast sessions.

Figure 7:
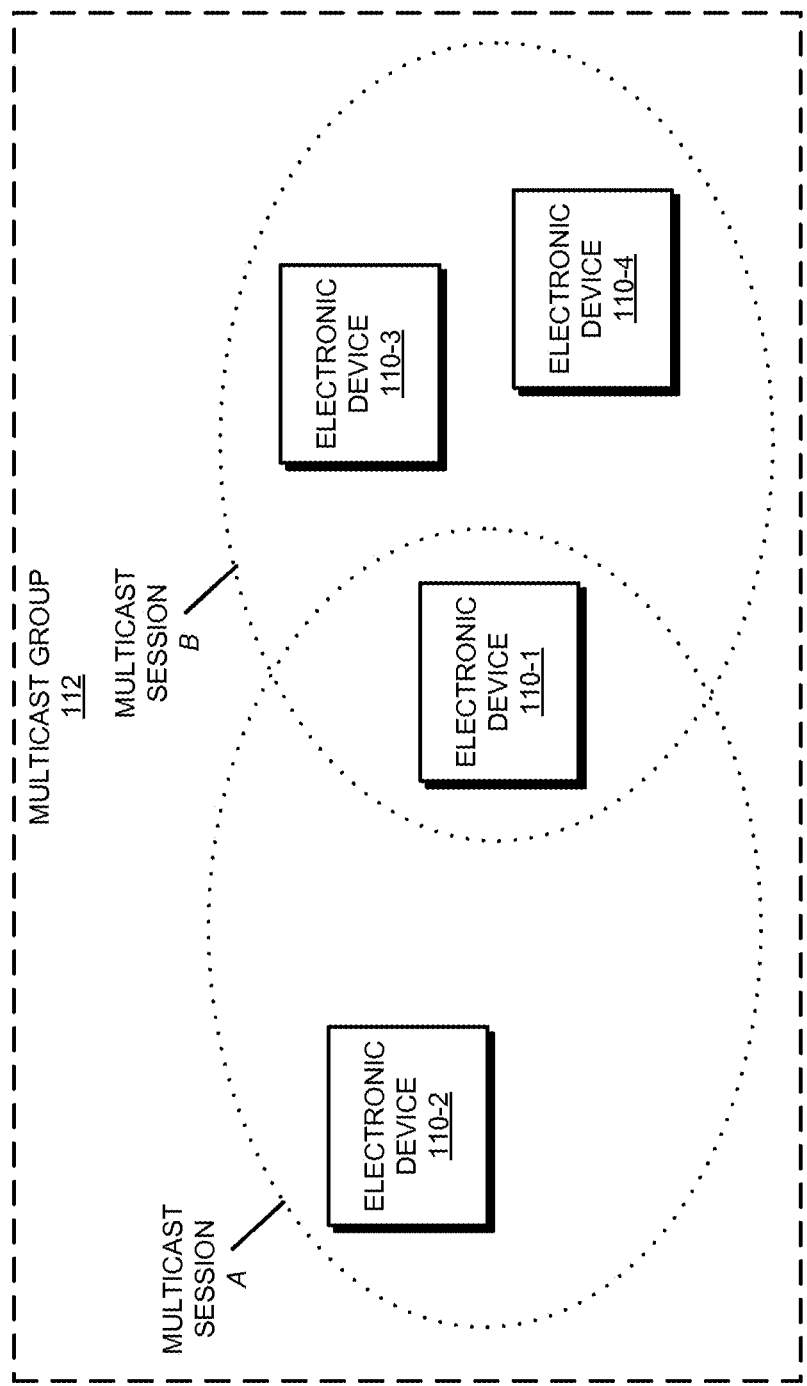
FIG. 7 is a drawing illustrating an example for broadcasting content to different multicast sessions in the multicast group of FIG. 1 in accordance with an embodiment of the present disclosure.

Moreover, as described further below with reference to FIG. 7, electronic device 110-1 may manage different concurrent multicast sessions, which may use common or different source(s). In an embodiment, the role of the multicast group master may be transferred from one electronic device 110 (e.g. electronic device 110-1) to another of electronic device 110. In an embodiment, the information used by one or more multicast-group masters to manage a multicast group (e.g. multicast group 112) may be stored in a central data structure and/or a distributed data structure (e.g. across multiple electronic devices and/or locations).

In an embodiment, after an electronic device has joined multicast group 112, additional authentication (or secure setup) may not be necessary when a new multicast session is defined or setup by electronic device 110-1. In particular, when electronic device 110-1 enrolls a new member into multicast group 112, layer-2 media-access-control (MAC) authentication may be used to securely setup the new member. This authentication information may persist at the multicast group level, such that additional authentication is not needed when the new multicast session is defined. Consequently, electronic device 110-1 may, as needed, dynamically switch electronic devices 110 among multiple sources of content without additional secure-setup delays. In these ways, the communication technique may allow electronic device 110-1 to flexibly manage membership and/or multicast sessions in multicast group 112 to ensure quality of service/reliability and/or to reduce power consumption.

Alternatively, or additionally to the aforementioned operations and capabilities, as described further below with reference to FIGS. 9-12, one or more of electronic devices 110 (e.g. electronic device 110-1 and, more generally, a source of the content) may transmit packets with concurrent pairwise samples of a media clock (e.g. clock associated with MPEG) and a radio clock (e.g. a clock associated with an IEEE 802.11 communication protocol). A recipient of these concurrent pairwise samples (e.g. electronic device 110-2) may use this information for low-jitter synchronization of a media clock in electronic device 110-2 with a media clock in electronic device 110-1. Thus, in an embodiment, IEEE 802.11 timing measurements may be used to more accurately synchronize simultaneous rendering on multiple sinks than using media clock timestamps in MPEG program clock reference fields (e.g. in the MPEG transport stream headers) that are embedded in certain A/V data or content streams.

Figure 2:
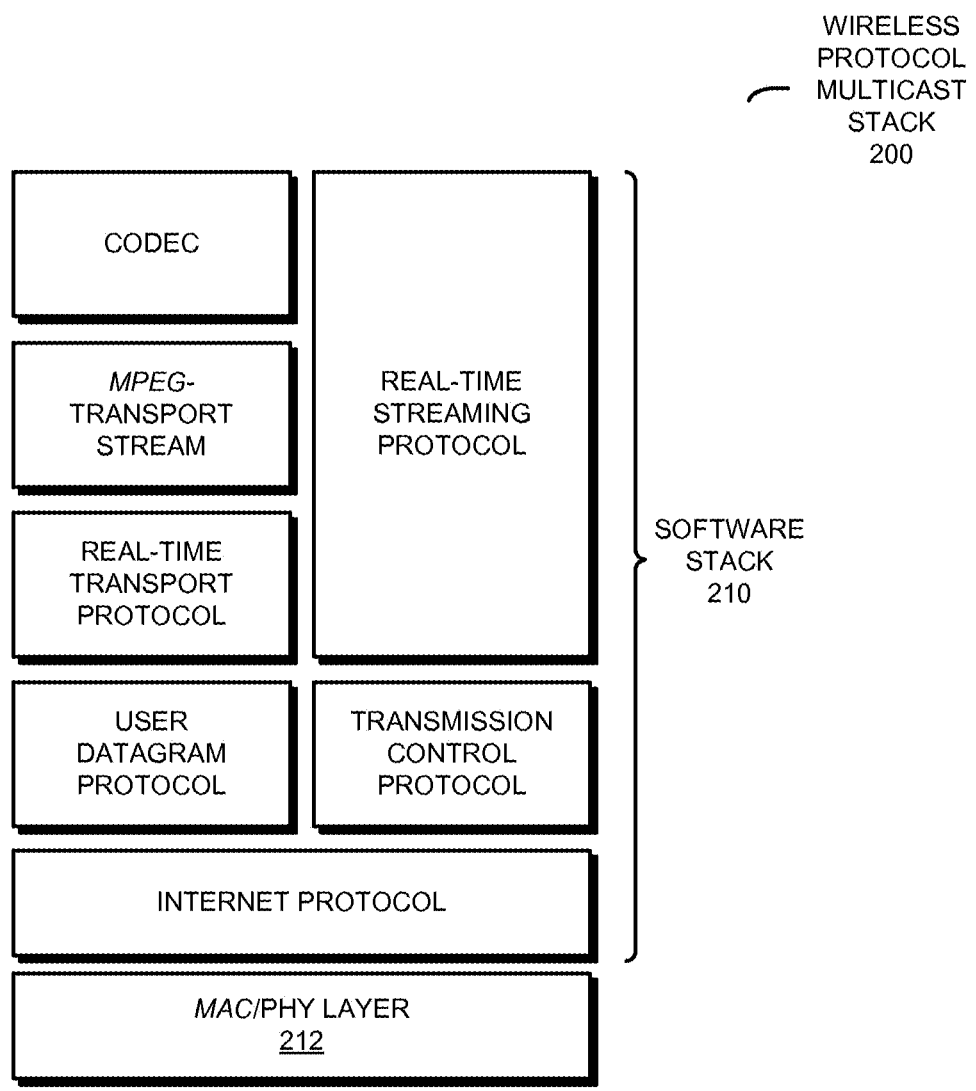
FIG. 2 is a drawing illustrating an example wireless multicast protocol stack in one of the electronic devices of FIG. 1 in accordance with an embodiment of the present disclosure.

FIG. 2 is a block diagram of a wireless multicast protocol stack 200 in one of the electronic devices 110, according to an example embodiment. In an embodiment, software stack 210 may perform functions such as: encoding, packetizing, content protection, timestamping, etc. Moreover, the MAC/physical layer 212 (e.g. a data plane), which implements one or more radios, may perform the functions of QoS/reliability control, power saving, etc. In an embodiment, software stack 210 may implement the multicast group management protocol, while multicast service discovery and connection management may be implemented by software stack 210 and MAC/physical layer 212.

Similarly, in an embodiment, the synchronization technique may be implemented by software stack 210 and MAC/physical layer 212. For example, MPEG or another A/V compression technique may be implemented in stack 210, while one or more radio clocks may be implemented in MAC/physical layer 212.

Figure 13:
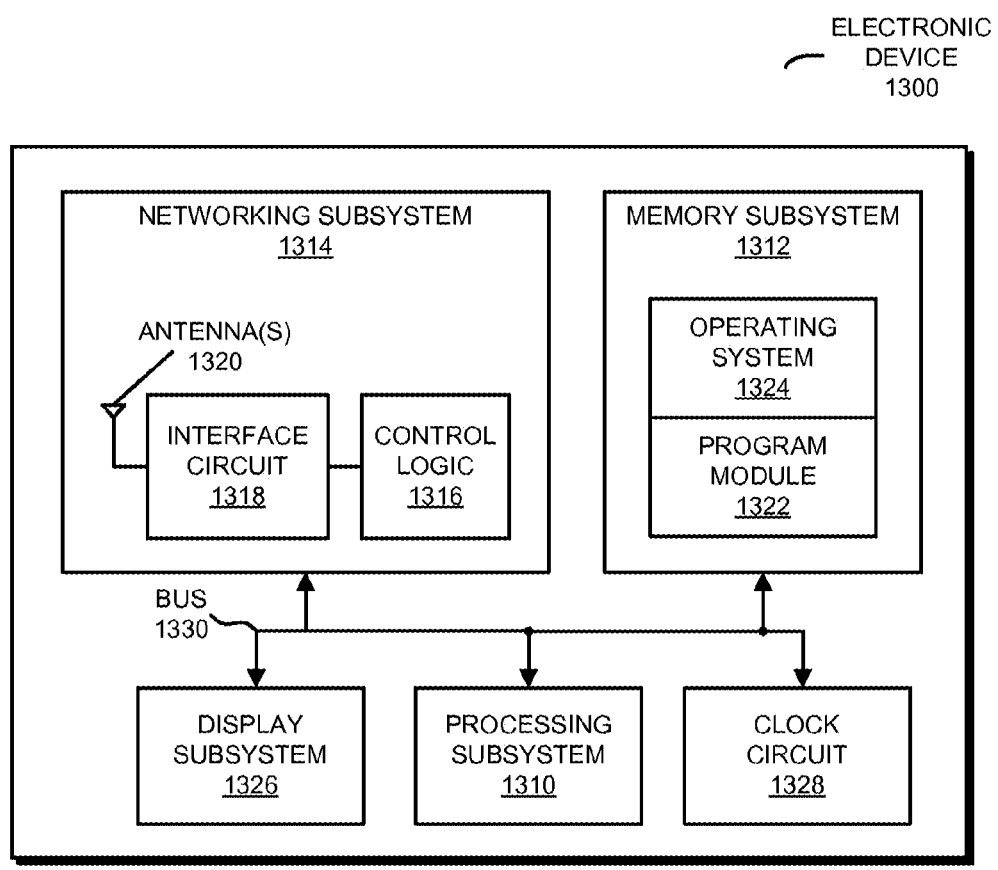
FIG. 13 is a block diagram illustrating an example one of the electronic devices of FIG. 1 in accordance with an embodiment of the present disclosure.

Referring back to FIG. 1, as described further below with reference to FIG. 13, electronic devices 110 may include subsystems, such as a networking subsystem, a memory subsystem and a processor subsystem. In addition, electronic devices 110 may include radios 114 in the networking subsystems. More generally, electronic devices 110 can include (or can be included within) any electronic devices with the networking subsystems that enable electronic devices 110 to wirelessly communicate with another electronic device. This can comprise transmitting beacons on wireless channels to enable electronic devices to make initial contact with or detect each other, followed by exchanging subsequent data/management frames (e.g. connect requests) to establish a connection, configure security options (e.g. IPsec), transmit and receive packets or frames via the connection, etc. As illustrated in FIG. 1, wireless signals 116 (represented by a jagged line) are transmitted from a radio 114-1 in electronic device 110-1. These wireless signals 116 are received by radios 114-2, 114-3 and 114-4 in electronic devices 110-2, 110-3 and 110-4.

In the described embodiments, processing a packet or frame in electronic devices 110 includes: receiving wireless signals 116 with the packet or frame; decoding/extracting the packet or frame from received wireless signals 116 to acquire the packet or frame; and processing the packet or frame to determine information contained in the packet or frame (such content associated with a particular multicast session in multicast group 112).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 3:
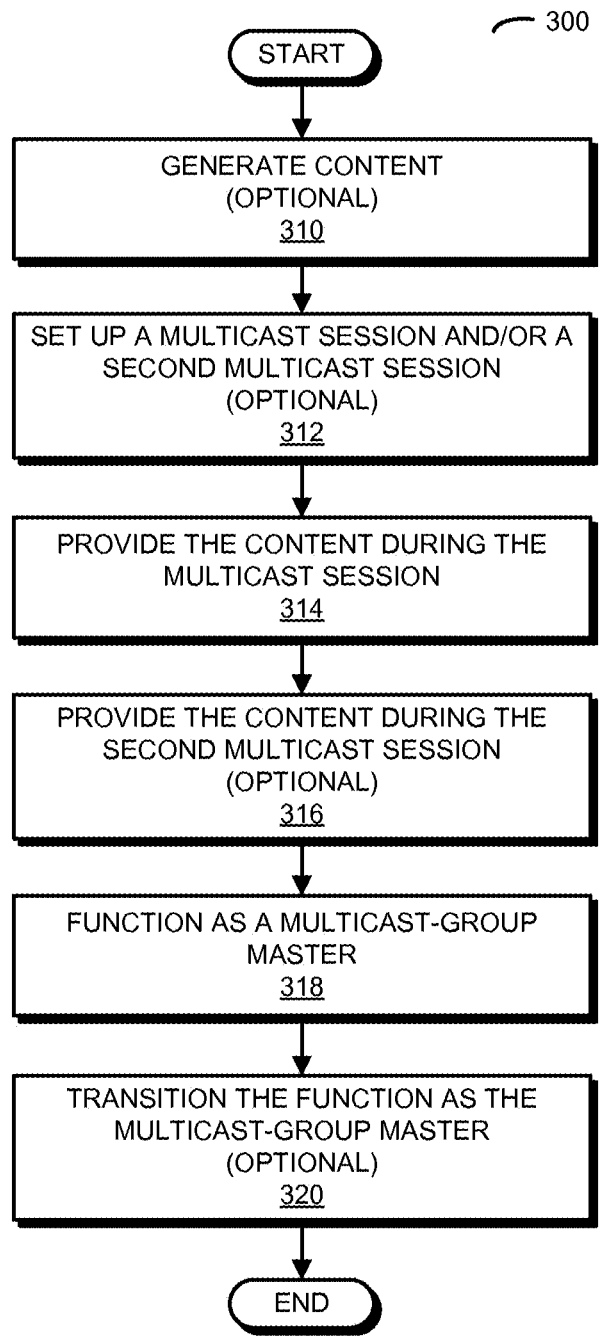
FIG. 3 is a flow diagram illustrating an example method for broadcasting content among at least some of the electronic devices of FIG. 1 in accordance with an embodiment of the present disclosure.

FIG. 3 is a flow diagram illustrating a method 300 for broadcasting content among at least some of electronic devices 110 (FIG. 1), according to an example embodiment. In an embodiment, the broadcasting may be performed by an electronic device (e.g. a multicast group master such as electronic device 110-1 in FIG. 1).

In step 310 of FIG. 3, an electronic device optionally generates the content, e.g. A/V information.

In step 312 of FIG. 3, the electronic device optionally sets up a multicast session and/or a second multicast session. In an embodiment, setting up a given multicast session may exclude authentication of electronic devices in the multicast group (and, more generally, without a secure setup process) because this may have been previously performed by a multicast group master in the multicast group when the electronic devices were enrolled or added to the multicast group. However, authentication may be performed if the multicast session is established outside of the multicast group context.

In step 314 of FIG. 3, the electronic device broadcasts the content to a multicast session that includes a subset of a multicast group.

In step 316 of FIG. 3, the electronic device may optionally broadcast the content to a second multicast session that includes a second subset of the multicast group, where the second multicast session is different than the first multicast session. For example, the second multicast session may include at least some different electronic devices in the multicast group than the first multicast session. In an embodiment, the electronic device may optionally broadcast different content, or the same content with different encoding or parity information, to the second multicast session than the first multicast session. In an embodiment, the content (or different content) may be broadcast to the second multicast session concurrently with the broadcast to the first multicast session and/or the content may be broadcast differently to the second multicast session than to the first multicast session.

In step 318 of FIG. 3, the electronic device may perform the functions of a multicast group master for the multicast group, where the multicast-group master manages membership in multicast sessions and/or the multicast group.

In step 320 of FIG. 3, the electronic device optionally transitions the function as the multicast group master to another electronic device in the multicast group. For example, the transition may be in response to a request from the electronic device itself or the other electronic device.

Figure 4:
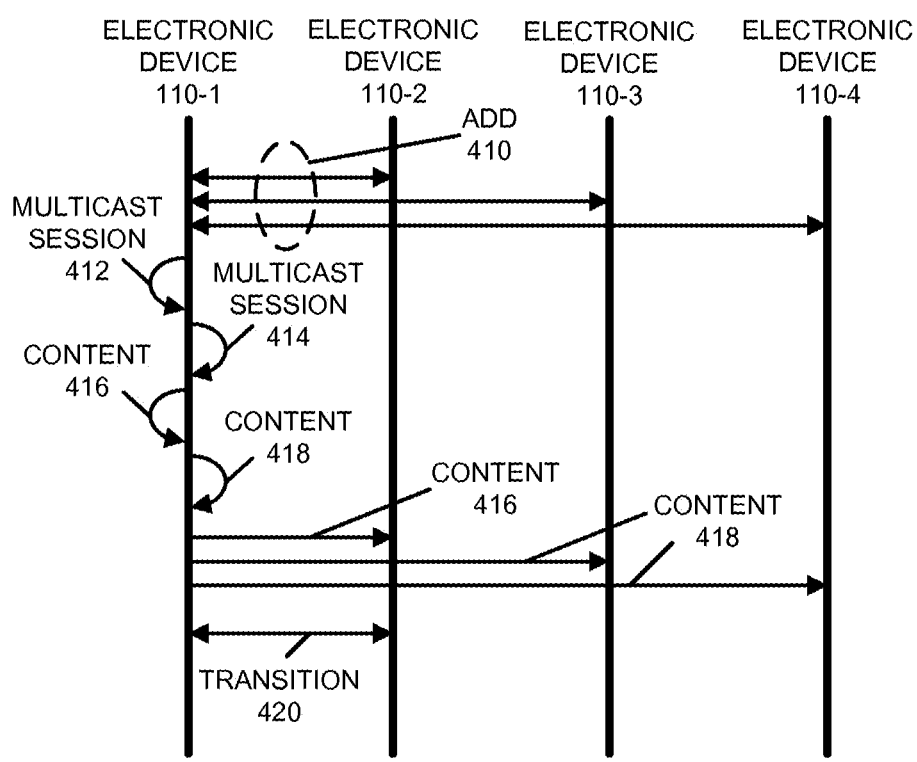
FIG. 4 is a drawing illustrating example communication among the electronic devices of FIG. 1 in accordance with an embodiment of the present disclosure.

The communication technique is further illustrated in FIG. 4, which presents a flow diagram illustrating communication among electronic devices 110 of FIG. 1, such as electronic device 110-1 communicating with electronic devices 110-2, 110-3 and 110-4. During operation, electronic device 110-1 may enroll or add 410 electronic devices 110-2, 110-3 and 110-4 into multicast group 112. Then, electronic device 110-1 may set up or specify a multicast session 412 that includes electronic devices 110-1 and 110-2, and may optionally set up or specify a multicast session 414 that includes electronic devices 110-1, 110-3 and 110-4.

Next, electronic device 110-1 may optionally generate content 416 and/or 418. In an embodiment, content 416 and 418 may be the same or different from each other. Moreover, electronic device 110-1 may broadcast content 416 to multicast session 412, and may optionally broadcast content 418 to multicast session 414. In an embodiment, these broadcasts may be concurrent.

Subsequently, electronic device 110-1 may optionally transition 420 the role of multicast group master to electronic device 110-2.

These communication techniques may allow the broadcast of the content in different multicast sessions to be different from each other.

Figure 5:
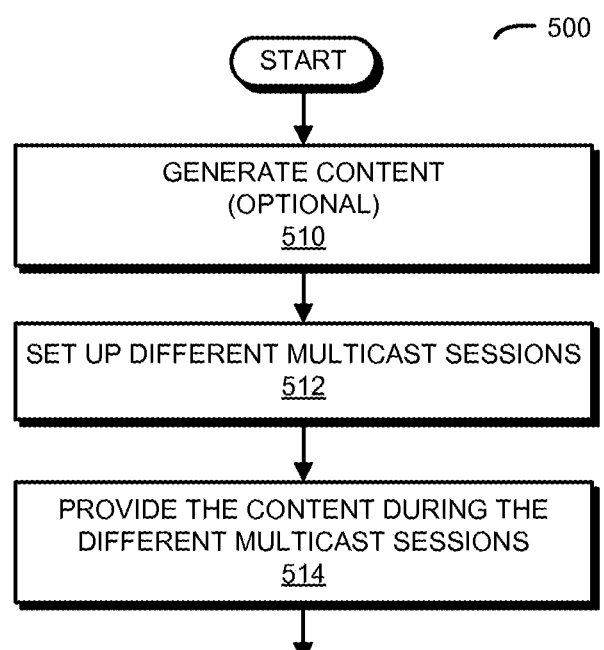
FIG. 5 is a flow diagram illustrating an example method for broadcasting content among at least some of the electronic devices of FIG. 1 in accordance with an embodiment of the present disclosure.

FIG. 5 is a flow diagram illustrating a method 500 for broadcasting content by an electronic device to at least some of electronic devices 110 in FIG. 1, according to an example embodiment. In an embodiment, this broadcasting may be performed by a multicast-group master, e.g. electronic device 110-1 in FIG. 1.

In step 510 of FIG. 5, the electronic device optionally generates the content.

In step 512 of FIG. 5, the electronic device optionally set ups or specifies the different multicast sessions.

In step 514 of FIG. 5, the electronic device broadcasts the content (or different content) to different multicast sessions in the multicast group, where a given multicast session includes at least a subset of the multicast group, and the content (or the different content) is broadcast differently to the different multicast sessions.

In an embodiment, broadcasting the content (or the different content) to the different multicast sessions may involve a multicast broadcast and/or a unicast broadcast. Moreover, in an embodiment, the broadcasts to the different multicast sessions may have different priorities based on a criticality metric of packets associated with the content. In another embodiment, the broadcasts to the different multicast sessions may use different encoding techniques. For example, the different encoding techniques may include different layers in H.264 Scalable Video Coding. In another embodiment, the broadcasts to the different multicast sessions may have different quality-of-service policies and/or different reliability. In another embodiment, the broadcasts to the different multicast sessions may include a different number of parity bits. In particular, the parity bits may be associated with application layer FEC.

Figure 6:
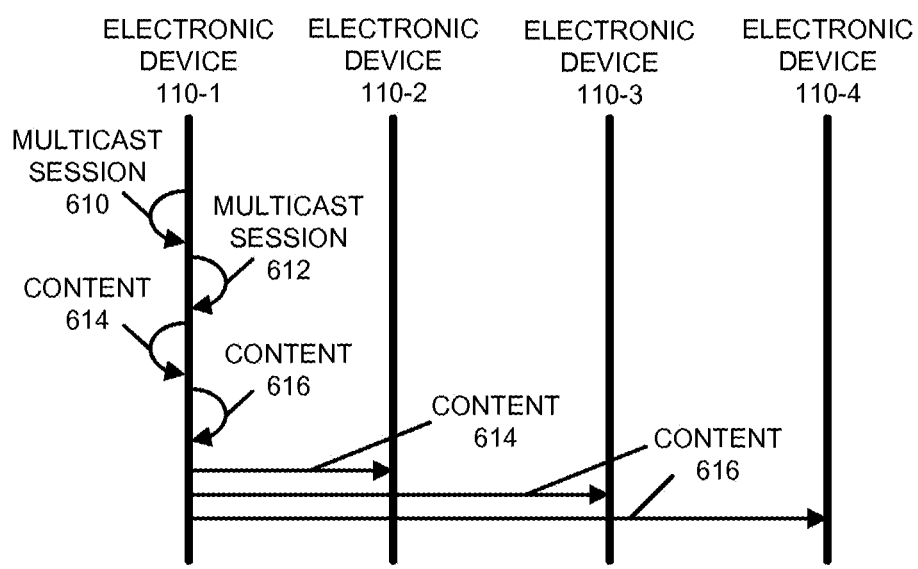
FIG. 6 is a drawing illustrating example communication among the electronic devices of FIG. 1 in accordance with an embodiment of the present disclosure.

The communication technique is further illustrated in FIG. 6, which presents a flow diagram illustrating communication among electronic devices 110 of FIG. 1, such as electronic device 110-1 communicating with electronic devices 110-2, 110-3, 110-4. During operation, electronic device 110-1 may set up or specify a multicast session 610 that includes electronic devices 110-1 and 110-2, and may set up or specify a multicast session 612 that includes electronic devices 110-1, 110-3 and 110-4.

Next, electronic device 110-1 may optionally generate content 614 and/or 616 (which may be the same or different from each other). Moreover, electronic device 110-1 may broadcast content 614 to multicast session 610, and may broadcast content 616 to multicast session 612. In an embodiment, these broadcasts may be concurrent and/or the content in the broadcasts may be broadcast differently.

By using multicast sessions, the electronic device may facilitate flexible communication of the content among electronic devices 110 in FIG. 1

In an embodiment, the flexibility and efficient resource-usage offered by multicast group management protocol may be applied in a wide variety of use cases. For example, in a classroom environment, there may be multiple sinks (e.g. 10-100 data or content streams). These sinks may require low latency because of possible source-sink interaction. In addition, sinks may dynamically switch sources. Alternatively, in home entertainment, there may be fewer data sinks (e.g. less than five). In this case, sinks may be able to tolerate longer latency when the content includes a movie. Moreover, in wireless audio sharing, there may be a few data sinks, and a source may share the same audio with multiple sinks. Furthermore, in conference room, there may be several content sinks (e.g., 10-30), and sinks may dynamic switch between sources.

The above embodiments may address the disparate needs of these different use cases. As noted previously, there may be three or more different device roles in a multicast group. A multicast group may also be referred to as a wireless A/V multicast group. However, as would be appreciated by a person of ordinary skill in the art, the above embodiments are applicable to multicast use cases other than wireless A/V multicast. The device roles may include: a source that generates wireless-display content; a sink that consumes wireless-display content, and a multicast group master. The multicast-group master may: create multicast groups, admit electronic devices into a multicast group, and/or manages multicast sessions in a multicast group. In an embodiment, the multicast group master may manage source switching within a multicast group without the need for the electronic devices to go through a new secure-setup process. Moreover, in an embodiment, a multicast-group master is a logical entity that can be located in the same physical electronic device as a source or a sink in a multicast group.

In an embodiment, a multicast group can have one or more multicast group masters. In an embodiment, each multicast-group master can manage the membership of the multicast group. Moreover, electronic devices in the multicast group may not need to go through a new secure-setup process when a new multicast session is set up between electronic devices in the same multicast group.

In an embodiment, a multicast session may be setup only for electronic devices in the same multicast group. In an embodiment, a multicast group may have one or more multicast sessions, either from the same source or from different sources. For example, all the electronic devices in a classroom may form a multicast group. An electronic device of the teacher may serve as the multicast group master. This multicast group master may create multiple multicast sessions each of which targets a different set of student electronic devices in the classroom. This is shown in FIG. 7, which presents a drawing illustrating broadcasting content to different multicast sessions in multicast group 112 of FIG. 1.

In an embodiment, a multicast group master may implement multiple functions. In particular, the multicast-group master may advertise an existing multicast group and multicast session information so that other electronic devices can decide to join. For example, the advertisements can be provided through layer-2 (e.g. MAC/physical layer 212 in FIG. 2) advertisement, which may involve pre-association and/or post-association communication. In another embodiment, the advertisements can be provided in software stack 210 of FIG. 2 via Miracast, Airplay and/or exchange of an application-layer message, such as real-time-streaming-protocol (RTSP) messages. Moreover, the multicast group master may manage group membership, including: admitting, rejecting, and inviting electronic devices to join a multicast group.

In an embodiment, a multicast group master may manage multicast sessions. For example, a source electronic device may initiate multicast session setup and/or the multicast-group master may also request other electronic devices to initiate a multicast session. Additionally, the multicast-group master may manage dynamic source switching. In particular, the multicast-group master may initiate source switching or may approve the switching process of other electronic devices.

In an embodiment, the multicast group master role can be handed over to another electronic device. In an embodiment, role switching may be possible only between electronic devices in the same multicast group. In an embodiment, role switching may be initiated by the current multicast group master and/or by a request from another electronic device in the same multicast group. In an embodiment, the multicast-group master may invite or approve one or more electronic devices to be multicast group masters in a multicast group.

As noted above, in an embodiment, the multicast group master role may be a different logical entity from another layer-2 group owner concept, but physically they can be co-located in the same electronic device. In an embodiment, it is possible that some multicast group masters only manage the membership of the multicast group, some multicast group masters only manage multicast sessions, and some multicast group masters can manage both multicast group membership as well as multicast sessions.

In an embodiment, the multicast-group management protocol may include or may support multiple elements. In particular, multicast capability discovery may support: the multicast-group management protocol; the maximum number of simultaneous multicast sessions (such as 10-100 multicast sessions); dynamic source switching; and serving as a multicast-group master. As would be appreciated by a person of ordinary skill in the art, capability discovery may be performed in software stack 210 in FIG. 2. Specifically, in an embodiment, capability discovery may be performed via an application-layer message, a layer-2 message or new fields in existing messages.

In an embodiment, during multicast-group discovery and multicast-session discovery, a multicast-group master may send messages to advertise the multicast group and/or one or more existing multicast sessions. Other electronic devices in the multicast group or the multicast session may also help with the advertisement. As would be appreciated by a person of ordinary skill in the art, this can be done at layer 2 or via software stack 210 in FIG. 2. Specifically, in an embodiment, this can be done via Miracast, Airplay and/or exchange of an application-layer message.

In an embodiment, during multicast-session setup, a multicast-group master or a source electronic device may initiate a multicast session. The multicast-session setup may include information such as the multicast address (e.g. a MAC address) used for a particular multicast session. In an embodiment, the multicast session setup can be performed using a multicast message. In an embodiment, the multicast message does not need to be acknowledged by the individual sinks. In an embodiment, the multicast address used for multicast session setup may be the multicast address obtained when the electronic device was admitted to the multicast group. As would be appreciated by a person of ordinary skill in the art, this approach may be suitable when there are a large number of sinks and where individual handshakes may take a long time. In another embodiment, the multicast session setup may also be achieved through individual handshakes with each sink. As would be appreciated by a person of ordinary skill in the art, this approach may be more suitable when there are a small number of sinks. Thus, multicast session setup may require handshakes between the source and the sinks, or may only require an announcement from the source.

In an embodiment, during multicast session source handover, the original multicast session source may initiate the handover to a potential source electronic device to request that it become the new multicast-session source. The handover may also be initiated by the multicast-group master, which can exchange messages with both the original and the new source electronic device to indicate the change of the source electronic device. As would be appreciated by a person of ordinary skill in the art, the multicast address used for a particular multicast session may not need to be changed when the source is changed. Moreover, as would be appreciated by a person of ordinary skill in the art, a change of the source can also be achieved by terminating the existing multicast session and starting a new multicast session. However, as would be appreciated by a person of ordinary skill in the art, this embodiment may involve additional message exchanges.

As summarized in Table 1, a variety of example messages may be communicated or used in the multicast group management protocol and/or multicast session management protocol. These messages can transported in application-level protocol messages such as RTSP messages and/or layer 2 messages. They can be defined as new messages or new fields in the existing protocol messages. For example, as would be appreciated by a person of ordinary skill in the art, they can be defined as new name value pairs in a Miracast message.

TABLE 1

| Message | Description |
| --- | --- |
| Multicast-group setup | A multicast-group master may use this message to advertise the setup of a new multicast group. |
| Multicast-group - master request and response | An electronic device can provide the request to an existing multicast-group master to be an additional multicast-group master. |
| Multicast-group - master invite | A multicast-group master can use this message to invite an electronic device as an additional multicast-group master. This message can also serve as a handover message if the multicast-group master, which sent this message, also indicates it is going to be a non-multicast-group master. |
| Join request | This message is sent to the multicast-group master to request to join a multicast group or multicast session. A joint request may include information such as a multicast-group identifier, a multicast-session identifier and multicast-session information (e.g., multicast sessions the electronic device is interested to receive), a supported video format, codec capability, etc. |
| Join response | This message is sent by the multicast-group master as a response to a join request. If the response is to admit the requesting electronic device, then the multicast-group master also provides the multicast address (such as a MAC address) to be used for this multicast group to the requesting electronic device. The multicast-group master may also inform the requesting electronic device of the multicast address used for one or more particular multicast sessions for which the requesting electronic device is interested. |
| Invite | This message is sent by the multicast-group master to invite an electronic device to join a multicast group or a multicast session. An invite may include information such as the multicast-group identifier and existing multicast-session information. |
| Leave | This message is used to indicate an electronic device is leaving a multicast group or multicast session. This message may include the multicast-group identifier and/or multicast session identifier. |
| Multicast-group termination and multicast-session termination | This message is sent by the multicast-group master or a source electronic device to terminate a multicast group or a multicast session. This message may include the multicast-group identifier or the multicast-session identifier. |

TABLE 1-continued

| Message | Description |
|---|---|
| Multicast-group maintenance and multicast-session maintenance | These messages function as keep-alive indicators from an electronic device that is used to maintain the membership of the electronic device in a multicast group and/or a multicast session. Keep alive can be done on a per multicast-session basis or on a per multicast-group basis. If on a per multicast-group basis, one keep-alive message may maintain the role of the electronic device in the multicast session(s) in which it is involved in the multicast group. |

Figure 8:
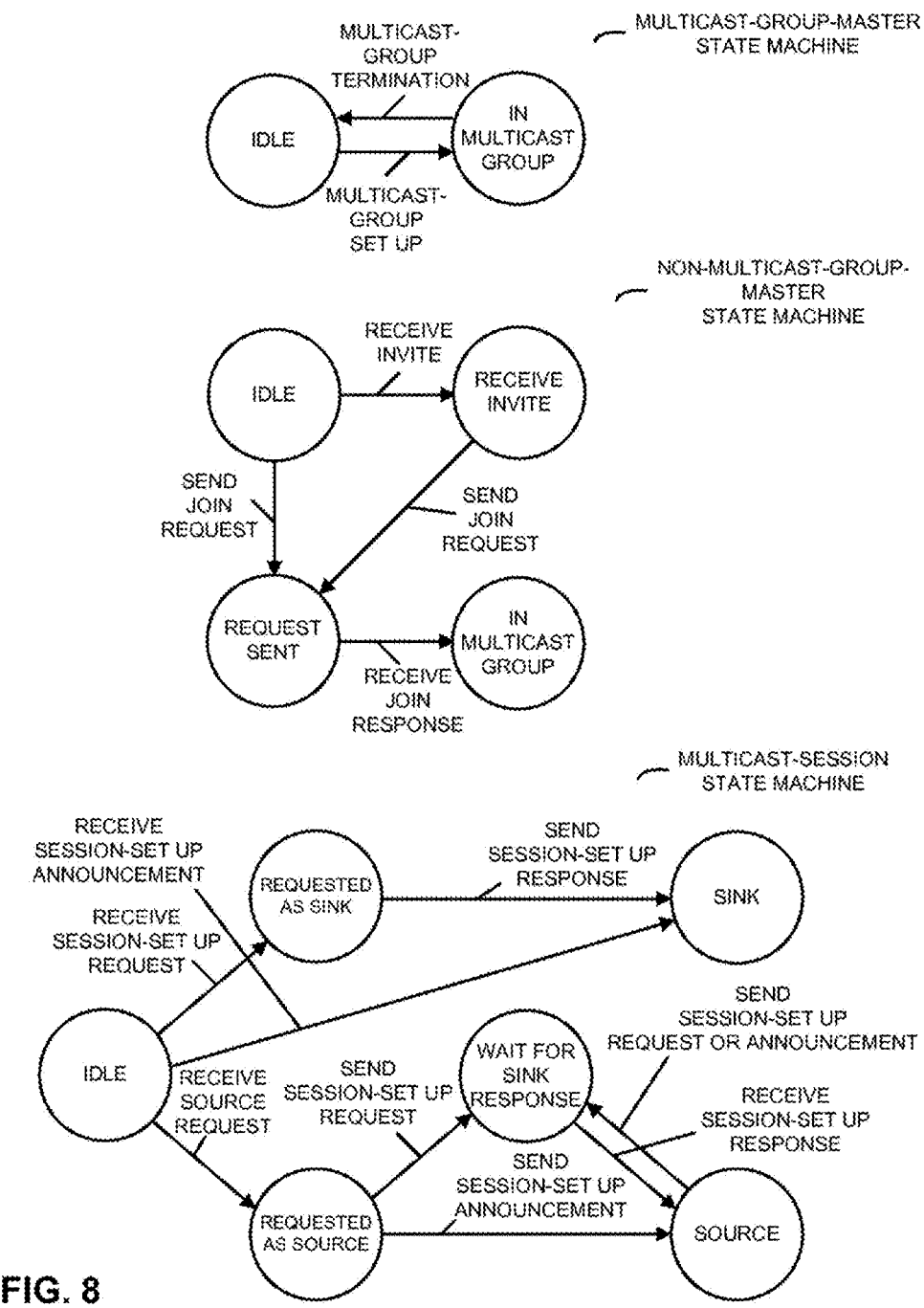
FIG. 8 is a drawing illustrating example state machines in the electronic devices of FIG. 1 in accordance with an embodiment of the present disclosure.

FIG. 8 presents a drawing illustrating state machines in electronic devices 100 of FIG. 1, according to example embodiment. In particular, FIG. 8 illustrates multicast group master and non-multicast group master state machines communicating using, for example, messages shown in Table 1 (or similar to those shown in Table 1). In addition, FIG. 8 illustrates a multicast session state machine. As would be appreciated by a person of ordinary skill in the art, the state-machine transitions may change depending on the specific protocol option implemented.

As would be appreciated by a person of ordinary skill in the art, there are different ways of providing multicast content. In particular, in a first case multicast content may be generated as multiple unicast streams at a source. Then, a separate A/V stream may be generated for each sink, e.g. repeatedly encoding, performing packetization, etc. for each sink even though the content is the same. Moreover, each individual A/V stream is then transmitted as unicast to each sink over a radio. As would be appreciated by a person of ordinary skill in the art, the first case may have the best QoS control, but may have the highest power consumption.

Alternatively, in a second case, multicast content may be generated once at the display stack, e.g. there may be one encoding process for all sinks. Then, the radio converts the single multicast stream into multiple unicast streams, and repeatedly transmits these to each sink. As would be appreciated by a person of ordinary skill in the art, the second case may have less power consumption and less guaranteed QoS.

In a third case, multicast content is generated once at in a display stack, e.g. there is one encoding process for all the sinks. Then, the radio transmits the multicast stream once to all the sinks. As would be appreciated by a person of ordinary skill in the art, the third case may have the lowest power consumption and the least guaranteed QoS.

However, as would be appreciated by a person of ordinary skill in the art, there may be problems associated with one or more of the three cases. In particular, in the first case, at the display engine, a source electronic device may repeat the A/V processing (e.g. A/V encoding, packetization, etc.) for each sink even though the content is the same for all the electronic devices. In this case, the transmitter consumes more power at the display engine. Moreover, at the radio, because each packet is sent to a sink in unicast fashion and is individually acknowledged, the packet delivery is more reliable and the QoS can be best tailored toward each sink. However, as would be appreciated by a person of ordinary skill in the art, unicasting packets to each sink may consume more wireless bandwidth and radio power. In some cases, when there is not sufficient wireless bandwidth, this approach is not feasible.

In the second case, at the display engine, the transmitter may only process the content once for all sinks. Thus more power can be saved at the display engine. However, as would be appreciated by a person of ordinary skill in the art, at the radio, the same content is repeatedly transmitted for each sink, which consumes more wireless bandwidth and radio power.

In the third case, the display engine may process the content once, and the radio transmits once to all sinks. As would be appreciated by a person of ordinary skill in the art, this is the most power-efficient approach OF the three cases discussed. However, as would be appreciated by a person of ordinary skill in the art, because no acknowledgement is used in multicasting at the radio, the QoS may be harder to control, and reliability may not be guaranteed.

These problems may be addressed by the described embodiments. In particular, in an embodiment, the display engine may only process content once for all sinks. In an embodiment, when the content reaches the radio for transmission, the transmitter can decide to deliver the content in a multicast manner to some sinks, and may deliver the content in a unicast manner to other sinks.

Moreover, in an embodiment, different delivery may be used for different multicast sessions. For example, the source may include multiple queues, which may be managed differently for different multicast sessions. Furthermore, in an embodiment, the transmitter may also group sinks into different multicast sessions, and may deliver the content to different multicast sessions differently, e.g., using a different modulation coding scheme. Referring back to FIG. 7, one source may send the same content to two multicast sessions using different transmission QoS policies. As would be appreciated by a person of ordinary skill in the art, the rules for how to group sinks into multicast sessions can be based on many factors. For example, some sinks may require a longer sleep interval and their traffic may be delivered in different delivery schedule so that these sinks can sleep longer. Alternatively or additionally, the source may: estimate the link quality to each sink; group the sinks into multicast sessions based on reception QoS; and use different modulation coding schemes on different multicast sessions. In an embodiment, information that specifies the link quality may be obtained from: previous data exchange, a feedback mechanism built into the multicast-group management protocol (e.g., RTSP feedback) and/or from the sink based on link reciprocity.

Additionally, in an embodiment, the source can also form multiple multicast sessions for the same set of sinks, and may deliver packets from the same display stream (or, more generally, content) differently based on the criticality of the packet. For example, the source may categorize the packets from the same display stream into two categories: one more important and one less important. Then, two multicast sessions may be formed with the same set of sinks, and different QoS policies may be applied to the transmissions to these two multicast sessions. In particular, the transmissions to one multicast session may be more reliable and the transmissions to the other multicast session may be less reliable. Packets from the same display stream may then be transmitted to these two multicast sessions based on their criticality. Consequently, as would be appreciated by a person of ordinary skill in the art, the packets may actually be delivered differently based on their criticality. As would be appreciated by a person of ordinary skill in the art, their criticality may be defined by a criticality metric).

In an embodiment, multiple multicast sessions may be used for an H.264 Scalable-Video-Coding stream. As would be appreciated by a person of ordinary skill in the art, H.264 Scalable Video Coding is a coding technique that generates multiple layers for the same video content. Each layer may correspond to a different set of information for the same video content. For example, a base layer may carry or convey the most-basic information and may be the most important for decoding. Moreover, higher layers may contain additional content information, which can provide better video quality if correctly decoded. In an embodiment, multiple multicast sessions may be created for different layers of a H.264 Scalable-Video-Coding stream. The electronic devices in these sessions may be the same. However, the radio QoS policies (e.g., the modulation coding schemes) can be set differently for the different multicast sessions. In particular, the base layer of the H.264 Scalable-Video-Coding stream may use the most robust modulation coding scheme so that the sinks have an improved chance of getting the basic-video information. Furthermore, higher layers of the H.264 Scalable-Video-Coding stream may use a more-efficient modulation coding scheme to minimize airtime but at the cost of reduced robustness. As would be appreciated by a person of ordinary skill in the art, the electronic devices that can decode these layers may have a better or an improved video experience.

In another embodiment, multiple multicast sessions may be used for application FEC. As would be appreciated by a person of ordinary skill in the art, application FEC is a technique used for additional error detection and correction on the application data, which may be performed above the radio. As would be appreciated by a person of ordinary skill in the art, this additional protection may be in addition to the FEC performed at the radio. Application FEC may generate additional parity bits that may be used to protect the original application data and to correct errors. In an embodiment, two multicast sessions may be formed when Application FEC is performed on wireless-display content. In an embodiment, one multicast session may be used to deliver the original content data and a different multicast session may be created for parity bits generated by application FEC. This latter multicast session may use a more robust radio policy (e.g., a low modulation coding scheme) to enhance reliability of the parity bits.

We now describe example embodiments of a synchronization technique for use with broadcasting multicast streams. In an embodiment, in order to ensure that a multicast stream is rendered at the same time on all sinks, the sinks in the multicast group must be synchronized with the source device. This is often done using a media clock, e.g. a Motion Pictures Experts Group (MPEG) media clock. As would be appreciated by a person of ordinary skill in the art, a media clock represents a particular point of time in playback of a multicast stream. But using a media clock to perform synchronization may be ineffective because the source device may generate the multicast stream faster than the sink will render it, and vice versa. More specifically, there may be a certain amount of delay or jitter from the point of timestamping a packet with a value from the media clock and the delivery of the packet at a sink.

Figure 9:
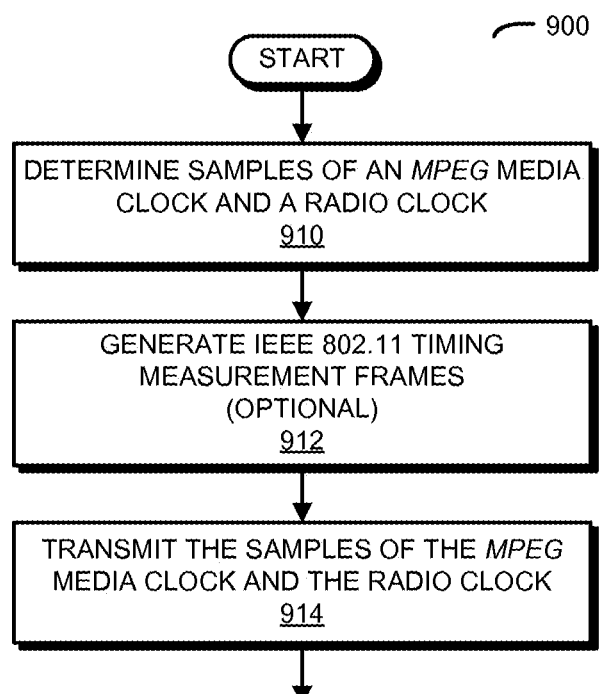
FIG. 9 is a flow diagram illustrating an example method for transmitting samples among at least some of the electronic devices of FIG. 1 in accordance with an embodiment of the present disclosure.

In an embodiment, the sinks in the multicast group may be synchronized with a source device by transmitting radio clock and media clock pair samples from the source to a sink and synchronizing the sink based on the relationship between the received pair samples. FIG. 9 is a flow diagram illustrating a method 900 for transmitting samples among at least some of electronic devices 110 in FIG. 1, which may be performed by an electronic device (such as electronic device 110-1 in FIG. 1 or, more generally, a source), according to an example embodiment.

In step 910 of FIG. 9, the electronic device determines the samples of an MPEG media clock and a radio clock associated with an interface circuit in the electronic device (e.g. a radio clock associated with an IEEE 802.11 communication protocol). For example, a processor or a circuit in the electronic device may concurrently sample the MPEG media clock and the radio clock. Over time, multiple pairs of samples of the MPEG media clock and the radio clock may be collected. As would be appreciated by a person of ordinary skill in the art, a radio clock may be any clock with a high degree of accuracy, and the multiple pairs of samples of the MPEG media clock and the radio clock may or may not be periodic. In an embodiment, the samples of the MPEG media clock and the radio clock may have a media clock timestamp format that is compatible with an MPEG program clock reference field. For example, the media clock timestamp format may include 42 bits.

In step 912 of FIG. 9, the electronic device optionally generates IEEE 802.11 timing measurement frames that include the samples of the MPEG media clock and the radio clock. For example, a given IEEE 802.11 timing measurement frame may include a pair of samples of the MPEG media clock and the radio clock.

In step 914 of FIG. 9, the electronic device transmits, to a second electronic device, the samples of the MPEG media clock and the radio clock. As would be appreciated by a person of ordinary skill in the art, the electronic device may transmit multiple pairs of samples over time, and the transmitting may involve transmitting the IEEE 802.11 timing measurement frames to the second electronic device.

In an embodiment, the second electronic device may use the multiple pairs of samples to synchronize its media clock. This is shown in FIG. 10, which presents a flow diagram illustrating a method 1000 for calculating a media clock in one electronic devices 110 in FIG. 1, which may be performed by a second electronic device (such as electronic device 110-2 in FIG. 1 or, more generally, a sink), according to an example embodiment. \

Figure 10:
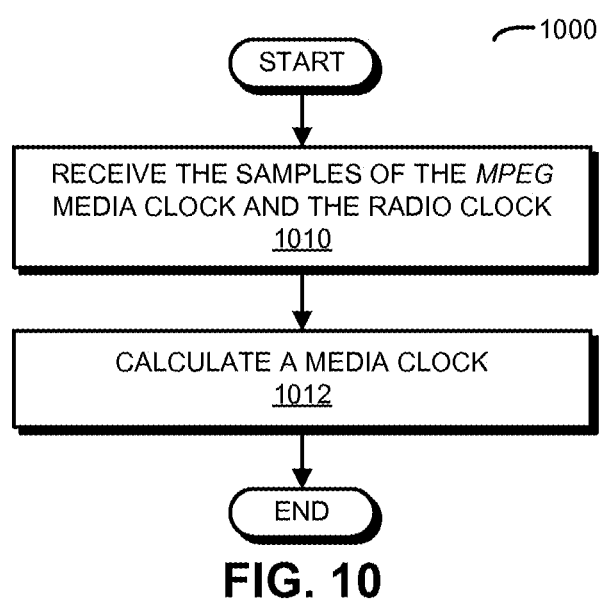
FIG. 10 is a flow diagram illustrating an example method for calculating a media clock in one of the electronic devices of FIG. 1 in accordance with an embodiment of the present disclosure.

In step 1010 of FIG. 10, the second electronic device receives the multiple samples of the MPEG media clock and the radio clock associated with the interface circuit in the electronic device.

T In step 1012 of FIG. 10, the second electronic device calculates the media clock based on a frequency of a second radio clock associated with a second interface circuit in the second electronic device, and the multiple samples of the MPEG media clock and the radio clock. As would be appreciated by a person of ordinary skill in the art, the second electronic device may use the calculated media clock instead of one or more MPEG program-clock-reference timestamps.

In some embodiments of methods 300 (FIG. 3), 500 (FIG. 5), 900 (FIG. 9) and/or 1000 (FIG. 10) there may be additional or fewer operations. For example, in FIG. 3, operation 310 may not be performed by the electronic device when the source is different than the multicast-group master. Alternatively or additionally, instead of providing or broadcasting the content differently to different multicast sessions, in some embodiments different multicast groups may be used to implement this capability. Moreover, the order of the operations may be changed, and/or two or more operations may be combined into a single operation.

In this way, the more-accurate and synchronized IEEE 802.11 radio clock may be used to synchronize the media clock, such as the MPEG media clock. This may reduce the synchronization time of the media clock and jitter in the media clock, and may improve the user experience by reducing inaccuracies between media clocks in a source and a sink (which can result in dropped packets and/or interpolation in the content when a large offset exists between the media clocks in the source and the sink).

Figure 11:
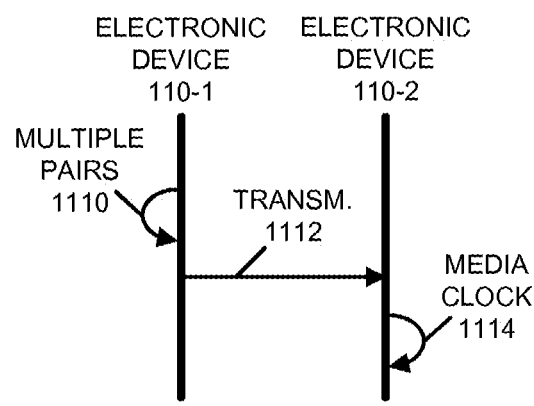
FIG. 11 is a drawing illustrating example communication among the electronic devices of FIG. 1 in accordance with an embodiment of the present disclosure.

The synchronization technique is further illustrated in FIG. 11, which presents a flow diagram illustrating communication among electronic devices 110 in FIG. 1, such as electronic device 110-1 communicating with electronic device 110-2. During operation, electronic device 110-1 determines multiple pairs 1110 of samples of the MPEG media clock and the radio clock associated with the interface circuit in electronic device 110-1. Then, electronic device 110-1 transmits 1112, to electronic device 110-2, the multiple pairs 1110 of samples of the MPEG media clock and the radio clock.

After receiving the multiple pairs 1110 of samples of the MPEG media clock and the radio clock, electronic device 110-2 may calculate media clock 1114 based on a frequency of the second radio clock associated with the second interface circuit in the second electronic device, and the multiple pairs 1110 of samples of the MPEG media clock and the radio clock.

The above synchronization embodiments may be used for wireless-display synchronization. Some compression techniques (such as MPEG) convey clock information between media clocks in the source and the sink. For example, the clock data may be embedded in the data. However, because display data or content often experiences (sometimes quite large) jitter at the transmitter and the receiver, the accuracy of the clock synchronization and time in sink cannot be guaranteed. The resulting longer synchronization time and inaccuracy can lead to a bad user experience because packets may need to be discarded and/or interpolation may be needed in the content when the offset between the clocks in the source and the sink is too large.

In the above embodiments, the timing mechanism in IEEE 802.11 may be used to synchronize the media clock in the sink with the media clock in the source. This approach leverages the low jitter in the IEEE 802.11 time measurement and delivery (e.g. the radio clocks in the source and the sink may have accuracies of 20 ppm, so the maximum offset between these radio clocks is 40 ppm), and may allow the media clocks to be synchronized more rapidly and with improved accuracy.

In an embodiment, a vendor-specific field in the IEEE 802.11 timing measurement frame or Fine Timing Measurement Frame may be used for wireless-display clock synchronization. As would be appreciated by a person of ordinary skill in the art, 802.11 timing measurement frame refers to either 802.11 timing measurement frame or 802.11 fine timing measurement frame. In particular, a media clock timestamp format, which is carried in the IEEE 802.11 timing measurement frame, is defined. For example, the media clock timestamp format may be compatible with an MPEG program clock reference field that is used in MPEG systems. This media clock timestamp format for the media clock may include 42 bits, including a 33-bit base at 90 kHz and 9 additional bits at 27 MHz). If the IEEE 802.11 timing measurement frame carries the media clock timestamp, then an MPEG program-clock-reference timestamp may be discarded by the sink. In this way, the jitter on the received clock timestamp (and, thus, the inaccuracy in the clock synchronization) may not be dominated by the MPEG program-clock-reference timestamp.

However, there can be problems with a timing measurement-based media-clock synchronization mechanism. In particular, if the media clock is sampled just before the preamble for the IEEE 802.11 timing measurement frame leaves the antenna, additional hardware support between the radio and the media system may be needed for real-time capture of the media clock with very low jitter. Any jitter incurred during this timestamp-capture process may add to the inaccuracy of the clock synchronization. For example, at time $t_1$ (e.g. a time of departure), an action frame with a timestamp may be transmitted from the source, and this frame may be received at time $t_2$ (e.g. a time of arrival) at the sink. Then, an acknowledgement may be transmitted at $t_3$ (e.g. a time of departure) from the sink, and this frame may be received at time $t_4$ (e/g/a time of arrival) at the source. t1 and t4 may be included in the next action frame with a timestamp, so the sink can estimate the offset between the local media clock and the media clock in the source as $[(t_2-t_1)-(t_4-t_3)]/2$.

In another embodiment, an accurate radio clock is used to synchronize the media clocks. In particular, the source samples the media clock and the radio clock at the same time. The source then sends the pair of clock timestamps (e.g., the samples of the media clock and the radio clock) to the sink. These operations are then repeated. As would be appreciated by a person of ordinary skill in the art, the sampling of the media clock and the radio clock in the source does not have to be periodic, although it can be periodic.

Figure 12:
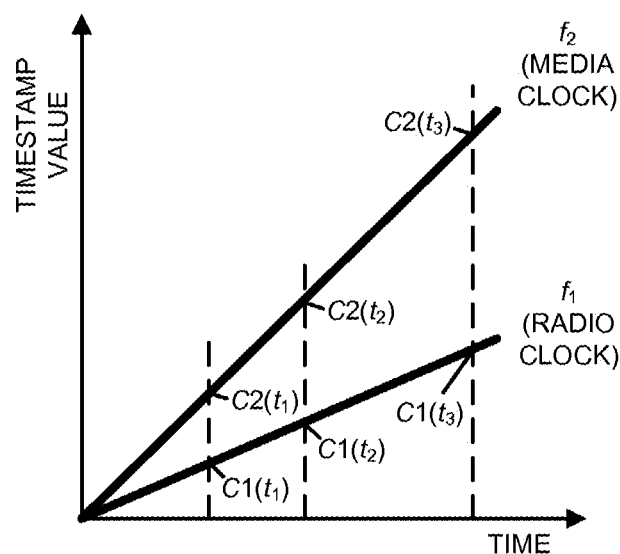
FIG. 12 is a drawing illustrating the example calculation of the media clock in one of the electronic devices of FIG. 1 in accordance with an embodiment of the present disclosure.

Next, the sink calculates its media clock based on its radio frequency (e.g. the frequency of the radio clock associated with an IEEE 802.11 communication protocol) and the series of timestamp pairs received from the source. This is shown in FIG. 12, which presents a drawing illustrating the calculation of the media clock in one of electronic devices 110 in FIG. 1. In particular, the frequency f2 of the media clock is $$f_1 \cdot [(C2(t_2)-C2(t_1))/(C1(t_2)-C1(t_1))],$$

where $f_1$ is the frequency of the radio clock, C2 is a counter increment (at a given time) of the sample of the media clock, and C1 is a counter increment (at a given time) of the sample of the radio clock.

Because the radio clocks between source and sink may already be synchronized with high accuracy (e.g. with a maximum offset of 40 ppm), the media clock can be quickly synchronized with similar accuracy. As noted previously, a given timestamp pair can be embedded in the IEEE 802.11 timing measurement frame using a vendor-specific field. Alternatively, a new over-the-air message may be used. As would be appreciated by a person of ordinary skill in the art, this embodiment of the synchronization technique avoids the need for real-time capture of the media clock timestamp at the moment when the IEEE 802.11 timing measurement frame is transmitted, and thus may require less hardware support.

We now describe embodiments of the electronic device. FIG. 13 presents a block diagram illustrating an electronic device 1300, such as one of electronic devices 110 in FIG. 1. This electronic device includes processing subsystem 1310, memory subsystem 1312, and networking subsystem 1314. Processing subsystem 1310 includes one or more devices configured to perform computational operations. For example, processing subsystem 1310 can include one or more microprocessors, application-specific integrated circuits (ASICs), microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as program module 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

The memory subsystem 1312 may include removable storage drives that interact with removable storage units. A removable storage unit may include a computer usable or readable storage device having stored thereon computer software (control logic) and/or data. Removable storage unit may be, for example, a floppy disk, magnetic tape, compact disk, DVD, optical storage disk, thumb drive or stick, memory card, and/any other computer data storage device. Removable storage drive reads from and/or writes to removable storage unit in a well-known manner.

In an embodiment, a tangible apparatus or article of manufacture comprising a tangible computer useable or readable medium having control logic (software) stored thereon is also referred to herein as a computer program product or program storage device. This includes, but is not limited to, tangible articles of manufacture embodying any combination of the components shown in FIG. 13. Such control logic, when executed by one or more data processing devices (such as electronic device 1300), causes such data processing devices to operate as described herein.

Networking subsystem 1314 includes one or more devices configured to couple to and communicate on a wired and/or wireless network (i.e., to perform network operations), including: control logic 1316, an interface circuit 1318 (with one or more associated radio clocks) and one or more antennas 1320. For example, networking subsystem 1314 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices as described previously.

Within electronic device 1300, processing subsystem 1310, memory subsystem 1312, and networking subsystem 1314 are coupled together using bus 1330. Bus 1330 may include an electrical, optical, and/or electro-optical connection that the subsystems can use to communicate commands and data among one another. Although only one bus 1330 is shown for clarity, different embodiments can include a different number or configuration of electrical, optical, and/or electro-optical connections between the subsystems.

In some embodiments, electronic device 1300 includes a display subsystem 1326 for displaying information on a display, which may include a display driver and the display, such as a liquid-crystal display, a multi-touch touchscreen, etc. In addition, electronic device 1300 may include clock circuit 1328 that outputs a clock (such as a media clock).

Electronic device 1300 can be (or can be included in) any electronic device with at least one network interface. For example, electronic device 1300 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, an access point, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. Additionally, one or more of the subsystems may not be present in electronic device 1300. Moreover, in some embodiments, electronic device 1300 may include one or more additional subsystems that are not shown in FIG. 13. For example, electronic device 1300 can include, but is not limited to, a data collection subsystem, an audio and/or video subsystem, an alarm subsystem, a media processing subsystem, and/or an input/output (I/O) subsystem. Also, although separate subsystems are shown in FIG. 13, in some embodiments, some or all of a given subsystem or component can be integrated into one or more of the other subsystems or component(s) in electronic device 1300. For example, in some embodiments program module 1322 is included in operating system 1324.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1314, such as a radio. Moreover, the integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While communication protocols compatible with Wi-Fi was used as illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique and/or the synchronization technique may be implemented using program module 1322, operating system 1324 (such as a driver for interface circuit 1318) and/or in firmware in interface circuit 1318. Alternatively or additionally, at least some of the operations in the communication technique and/or the synchronization technique may be implemented in a physical layer, such as hardware in interface circuit 1318.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. An electronic device, comprising:
   an interface circuit configured to communicate with electronic devices in a multicast group;
   a memory; and
   a processor coupled to the memory and configured to:
      setup a multicast-group master for the multicast group, wherein the multicast-group master manages membership in at least one of a first multicast session, a second multicast session, or the multicast group;
      accessing content; and
      broadcast, via the interface circuit, the content to the first multicast session that includes a first subset of the multicast group.

2. The electronic device of claim 1, wherein the second multicast session is configured without authenticating the electronic devices in the multicast group.

3. The electronic device of claim 1, wherein the processor is further configured to:
   broadcast, via the interface circuit, the content to the second multicast session, wherein the second multicast session is different than the first multicast session.

4. The electronic device of claim 1, wherein the processor is further configured to:
   determine multiple samples of an MPEG media clock and a radio clock associated with the interface circuit; and
   transmit the samples of the MPEG media clock and the radio clock to a second electronic device.

5. The electronic device of claim 1, wherein the processor is further configured to:
   transfer a multicast-group master to a second electronic device.

6. The electronic device of claim 1, wherein the processor is further configured to:
   transfer a broadcast source for the multicast group to a second electronic device.

7. An electronic device, comprising:
an interface circuit configured to communicate with electronic devices in a multicast group;
a memory; and
a processor coupled to the memory and configured to:
define a first multicast session associated with the multicast group, wherein the first multicast session comprises a first subset of the electronic devices in the multicast group, and the first multicast session having a first reception characteristic for the first subset of electronic devices;
define a second multicast session associated with the multicast group, wherein the second multicast session comprises a second subset of the electronic devices in the multicast group, and the second multicast session having a second reception characteristic for the second subset of electronic devices;
access content;
broadcast, via the interface circuit, the content to the first multicast session associated with the multicast group using a first transmission method or a first format; and
broadcast, via the interface circuit, the content to the second multicast session associated with the multicast group using a second transmission method or a second format associated with the second reception characteristic.

8. The electronic device of claim 7, wherein the processor is further configured to:
broadcast to the first multicast session using a first priority associated with the first reception characteristic based on a criticality metric of packets associated with the content.

9. The electronic device of claim 7, wherein the processor is further configured to:
broadcast to the first multicast session using a first encoding technique associated with the first reception characteristic.

10. The electronic device of claim 7, wherein the processor is further configured to:
broadcast to the first multicast session using a first quality-of-service policy associated with the first reception characteristic.

11. The electronic device of claim 7, wherein the processor is further configured to:
broadcast to the first multicast session using a first number of parity bits associated with the first reception characteristic.

12. The electronic device of claim 11, wherein the parity bits are associated application layer forward error correction.

13. An electronic device, comprising:
an interface circuit configured to communicate with an other electronic device, wherein the electronic device is configured to:
determining multiple samples of an MPEG media clock and a radio clock associated with the interface circuit;
generating a timing measurement frame, wherein the timing measurement frame comprises the multiple samples of the MPEG media clock and the radio clock; and
transmit, via the interface circuit, the timing measurement frame to the other electronic device.

14. The electronic device of claim 13, wherein, for a given sample, the MPEG media clock and the radio clock are concurrently sampled.

15. The electronic device of claim 13, wherein the timing measurement frame comprises an IEEE 802.11 timing measurement frame.

16. The electronic device of claim 15, wherein the samples of the MPEG media clock and the radio clock have a media clock timestamp format that is compatible with an MPEG program clock reference field.

17. The electronic device of claim 13, wherein the samples of the MPEG media clock and the radio clock are other than periodic.

18. The electronic device of claim 13, wherein the samples of the MPEG media clock and the radio clock are included in a VendorSpecific field in a IEEE 802.11 timing measurement frame.

19. The electronic device of claim 13, wherein the samples of the MPEG media clock and the radio clock have a media clock timestamp format that is compatible with an MPEG program clock reference field.

20. The electronic device of claim 13, wherein the electronic device is further configured to use a calculated media clock instead of a MPEG program-clock-reference timestamp.

21. The electronic device of claim 1, wherein the multicast-group master is a logical entity.

22. The electronic device of claim 7, wherein the processor is further configured to:
broadcast to the first multicast session using a first delivery schedule associated with the first reception characteristic.

23. An electronic device, comprising:
an interface circuit-configured to communicate with electronic devices in a multicast group;
a memory; and
a processor coupled to the memory and configured to:
configure a first multicast session that comprises a first subset of the electronic devices in the multicast group, wherein the configuring authenticates the electronic devices in the multicast group;
configure a second multicast session that comprises a second subset of the electronic devices in the multicast group, wherein the second multicast session is configured without authenticating the second subset of the electronic devices in the multicast group; and
broadcast, via the interface circuit, content to the first multicast session.

* * * * *